United States Statutory Invention Registration [19]

[11] Reg. Number: H258

Henninger et al. [43] Published: Apr. 7, 1987

[54] DEWATERING PROCESS AND APPARATUS FOR SLURRY RECOVERED FROM WASTE WATER

[76] Inventors: Jeffrey L. Henninger, R.D. #2, Kempton, Pa. 19529; Michael A. Hart, 3901 Royena Ave., Reading, Pa. 19605; James R. Garraway, 1660 Reading Blvd., Wyomissing, Pa. 19610; Robert G. Elbert, 523 Martin Ave., Reading, Pa. 19601; Curtis P. Olinger, 234 E. Arch St., Fleetwood, Pa. 19522

[21] Appl. No.: 786,672

[22] Filed: Oct. 11, 1985

[51] Int. Cl.[4] ..... B01D 21/01; B01D 37/00; C02F 1/00

[52] U.S. Cl. ..... 210/737; 210/742; 210/771; 210/175

[58] Field of Search ..... 210/768–771, 210/737, 609, 180, 175, 194, 742

[56] References Cited

U.S. PATENT DOCUMENTS

| | | | |
|---|---|---|---|
| 4,050,390 | 9/1977 | Hara et al. | 210/771 |
| 4,133,756 | 1/1979 | Arai et al. | 210/742 |
| 4,226,712 | 10/1980 | Kamei | 210/770 |
| 4,321,151 | 3/1982 | McMullen | 210/771 |
| 4,330,411 | 5/1982 | Florin et al. | 210/771 |
| 4,358,381 | 11/1982 | Takeuchi et al. | 210/769 |

FOREIGN PATENT DOCUMENTS

| | | | |
|---|---|---|---|
| 2036787 | 7/1980 | United Kingdom | 210/769 |

OTHER PUBLICATIONS

Thomas C. M.; "The Use of Filter Presses for the Dewatering of Sludges" J.W.P.C.F. vol. 43, No. 1 pp. 93–101, (Jan. 1971).

*Primary Examiner*—John F. Terapane
*Assistant Examiner*—Susan Wolffe

[57] ABSTRACT

Process and apparatus for dewatering slurry recovered from waste water, generated in the production and treatment of metals, are provided in which the flocculated slurry is first dewatered mechanically to provide a water output which is returned upstream for further treatment, and a sludge output containing about 25–32 percent by weight (w/o) solids and the remainder free liquid. The sludge is passed through a thermal drier and, after substantially all the free water has been removed, is disposed of as desired.

8 Claims, 1 Drawing Figure

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

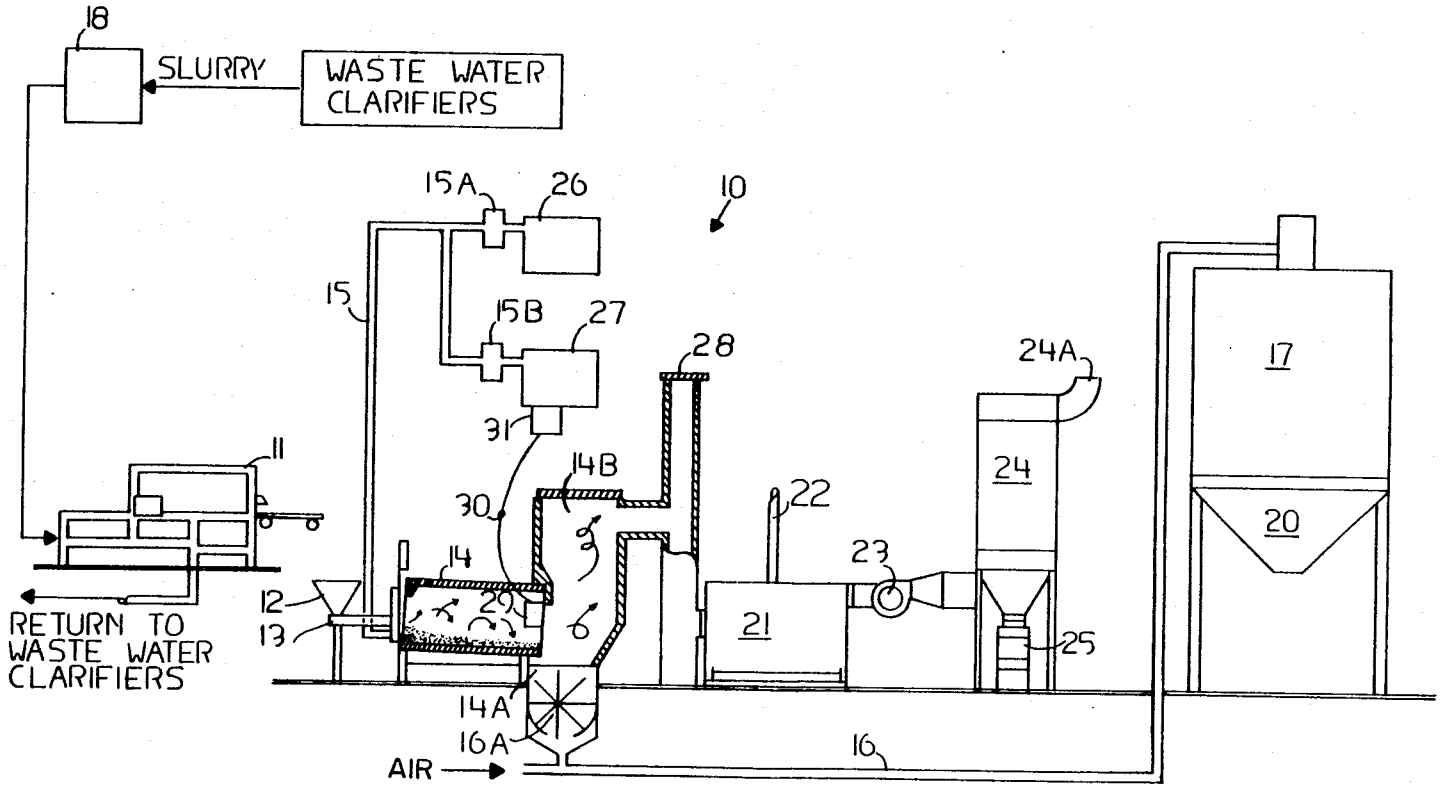
WASTE WATER CLARIFIERS
SLURRY
RETURN TO WASTE WATER CLARIFIERS
AIR
10
11
12
13
14
14A
14B
15
15A
15B
16
16A
17
18
20
21
22
23
24
24A
25
26
27
28
29
30
31

DEWATERING PROCESS AND APPARATUS FOR SLURRY RECOVERED FROM WASTE WATER

This invention relates to a process for treating waste water recovered from aqueous solutions used in the treatment of metals; and, more particularly, to such a system which is especially well suited for dewatering the slurry recovered from water clarifiers used in such processes and the sludge generated therefrom.

Waste water resulting from the manufacture and treatment of metals contains quantities of water soluble agents including salts, acids, detergents or the like. In the treatment of such waste water so as to put it into condition for return to a water supply such as a river, active agents are neutralized and undesirable solids removed. The solids are removed, usually by means of one or more clarifiers, to provide a waste water effluent returnable to a water supply and a slurry having a relatively low concentration of solids, e.g., about 1.5–2% by weight (w/o). The high free liquid content of the slurry requires further processing before the solids may be recycled, if desired, or disposed of as in a land fill.

While many systems have been proposed utilizing mechanical and/or thermal means for dewatering a wide variety of materials such as flour mill wastes, wet coal, manure or sewerage mud, none are concerned with the problems associated metals industry waste water treatment plants.

SUMMARY OF THE INVENTION

It is therefore a principal object to provide a method and apparatus for dewatering the slurry recovered from the treatment of waste water from metal-treating processes and then drying the resulting sludge to provide an end product of solids having a free water content below the maximum tolerable for land fill disposal.

In accordance with the present invention, the slurry recovered from the clarifiers of a plant for treating the waste water from metal-treating processes is first dewatered mechanically to provide a water output which is returned upstream for further treatment and a sludge output, containing about 25–32 w/o solids and the remainder free liquid. The sludge is passed through a thermal drier in heat-exchange relationship with a hot fluid. As the fluid and dried solids exit from the dryer they are separated into a primary and a secondary stream. The primary stream is made up of substantially all of the dried solids except for fines or dust which may remain entrained in the secondary stream. The secondary stream includes the major part of the fluid, and before separating out the dust and/or fines and disposing of the fluid, useful heat is extracted from it and recycled. The primary stream made up of the bulk of the dried solids is lead to a suitable storage bin where the solids are stored pending disposal thereof by recycling, in a land fill or as may be desired.

The foregoing as well as further objects and advantages of the present invention will be apparent from the following description of a preferred embodiment thereof and the accompanying drawing in which the single FIGURE shows diagrammatically a preferred slurry-sludge system in accordance with the present invention.

DETAILED DESCRIPTION

Referring now to the drawing, a preferred dewatering or slurry-sludge drying system 10 in accordance with the present invention comprises flocculating or coagulating the slurry from one or more waste water treatment plant clarifiers. The waste water treatment plant is one in which waste water from processing and rinsing metals are processed so that neutralized waste water can be recycled or returned to a water supply after undesired solids in the form of a slurry have been removed therefrom. The slurry obtained from the clarifiers contains such a high percentage of liquid, about 98 w/o, as to preclude ready disposal thereof. As shown, in the tank 18, an anionic polymer flocculating agent is added to the slurry from the waste water clarifiers. The amount and rate at which the agent is required may vary depending upon the variations in the slurry but is readily determined. Good results have been obtained with "HERCOFLOC" No. 1018 trademark of and a product of Hercules Inc., Wilmington, Del. Another product that may be used is CDP90088 polymer, a product of BETZ Laboratories, Inc., Trevose, Pa. From tank 18 the flocculated slurry is fed to a high pressure belt filter press 11. The belt filter press provides a sludge output to feed hopper 12, containing about 25–32 w/o solids and a filtrate output which as indicated in the drawing is returned upstream for further processing.

From hopper 12 the sludge is carried by a conveyor 13 to rotary dryer 14, preferably a rotary kiln dryer, connected by conduit 15 to a source of high temperature, relatively dry gas. As shown, conduit 15 is connected through a one way damper 15A to a source of waste heat such as is available from annealing or soaking ovens or the like utilized in the metals industry. To insure a continuous supply of hot gas or air at the required temperature, a branch of conduit 15 is also connected through one way damper 15B to an auxillary heat source which may be a gas fired heater. The temperature at which dryer 14 is operated, for best results, is not less than the stoichiometric balance point which depends, as is well known, upon such parameters as the quantity and rate at which the material is fed through and the amount of water required to be carried off as vapor. Tumbling of the sludge by the rotation of the dryer 14 brings the sludge and hot gas into intimate heat exchange and drying contact with the result that most of the remaining water, preferably 90 w/o or more, is removed from the sludge. The thus dried sludge makes up a primary output stream 14A from the dryer conveyed along pneumatic conveyor 16. The hot gas exits from the dryer 14 as a secondary stream 14B in which fines or dust from the dried sludge may be entrained and is lead into a heat recovery boiler 21. In boiler 21, heat from the secondary stream 14B is extracted as steam which is fed from boiler 21 by pipe 22 to provide a source of heat for any suitable heat utilization device or system. After passing through boiler 21 where heat is extracted from it, the relatively cool secondary stream passes through impeller or blower 23 to a separator such as bag house 24 where the dust and fines are filtered out and collected as in containers 25 while the gas is permitted to escape to the atmosphere as indicated at 24A or otherwise disposed of as may be desired or required. A normally closed damper 28 is opened for venting heat when blower 23 is shut down.

Pneumatic conveyor 16 receives the dried solids from the dryer 14 through a rotary lock 16A. Rotary lock 16A is preferrably positioned sufficiently distant from the dryer to ensure that the temperature of the dried solids has dropped to 250° F. or better yet 150° F. when the solids leave the rotary lock 16A. Conveyor 16 delivers the primarY stream of dried solids to a silo 17 or other place of storage pending recycling or disposal, as may be desired. When the dryness of the sludge is such that handling or transporting the sludge to a remote site, as in trucks, results in objectionable loss of fines or dust to the atmosphere, a suitable dust suppressant may be added, if desired, as the dried solids pass through silo hopper 20.

To insure minimum consumption of fuel by heater 27, the rate at which fuel is consumed is modulated in response to the temperature of the gas in the dryer 14. To that end, a thermocouple 29 or other heat responsive device is mounted near the exit opening of the dryer and is connected by lead 30 to a controller 31 which in turn is activated to increase or decrease the fuel flow rate as the temperature falls below or rises above the set point by a selected amount.

The process and apparatus of the present invention is highly efficient and cost effective in treating the slurry resulting from clarification of the waste water up to about 5000 pounds of sludge per hour containing about 32% by weight solids and 68% by weight water are readily converted to dry solids containing about 98% to 100% by weight solids. To that end the temperature of the hot gas delivered by pipe 15 to the dryer 14 is maintained high enough so that the temperature of the secondary stream after leaving the dryer and before entering the heat recovery boiler 21 is about 1200° F., the recovery boiler thereby being maintained at about 500° F.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. In a process for treating water recovered from aqueous solutions used in the treatment of metals and in which at least a portion of the waste water is a slurry containing solids, the steps of mechanically removing water from said slurry to provide a liquid output and an output in the form of a sludge having a substantially greater concentration of solids than said slurry, bringing said sludge into heat-exchange relationship with a hot drying agent so as to substantially dry said sludge and provide a primary stream of substantially dry solids and a secondary stream of said drying agent substantially free of solids, and recovering useful heat from said secondary stream.

2. The process as set forth in claim 1 in which said hot drying agent is a gas.

3. The process as set forth in claim 2 in which solids entrained in said secondary stream are separated therefrom after heat has been recovered from said secondary stream.

4. The process as set forth in claim 3 in which the solids in said slurry are first flocculated, then said slurry while being mechanically dewatered is filtered under substantial pressure so that said liquid output is a filtrate which is returned for further processing as waste water, and raising the temperature of said hot drying agent whenever the temperature of said secondary stream falls below a predetermined value.

5. In an apparatus for drying solids in a slurry from waste water recovered from aqueous metal-treating solutions, means for mechanically removing water from said slurry and providing a liquid output and a sludge output, said sludge output having a substantially greater concentration of solids than said slurry, drying means for thermally dewatering said sludge by placing it in heat-exchange relationships with a hot drying agent and for providing a primary stream made up substantially entirely of dry solids and a secondary stream of said drying agent substantially free of solids, and means for recovering useful heat from said secondary stream.

6. An apparatus as set forth in claim 5, in which said drying agent is a hot gas, and means for removing solids

7. An apparatus as set forth in claim 6, in which said means for mechanically removing water from said slurry is a high pressure belt filter press, said liquid output being the filtrate therefrom, said drying means is a rotary kiln dryer, and said heat recovering means is a boiler.

8. An apparatus as set forth in claim 6, in which means are provided for increasing the temperature of said hot drying agent in response to a drop in temperature of said secondary stream below a predetermined temperature.

* * * * *